July 21, 1953
C. OTTO
2,646,345
AMMONIA SATURATOR AND TAR REMOVAL APPARATUS
Filed Feb. 2, 1950
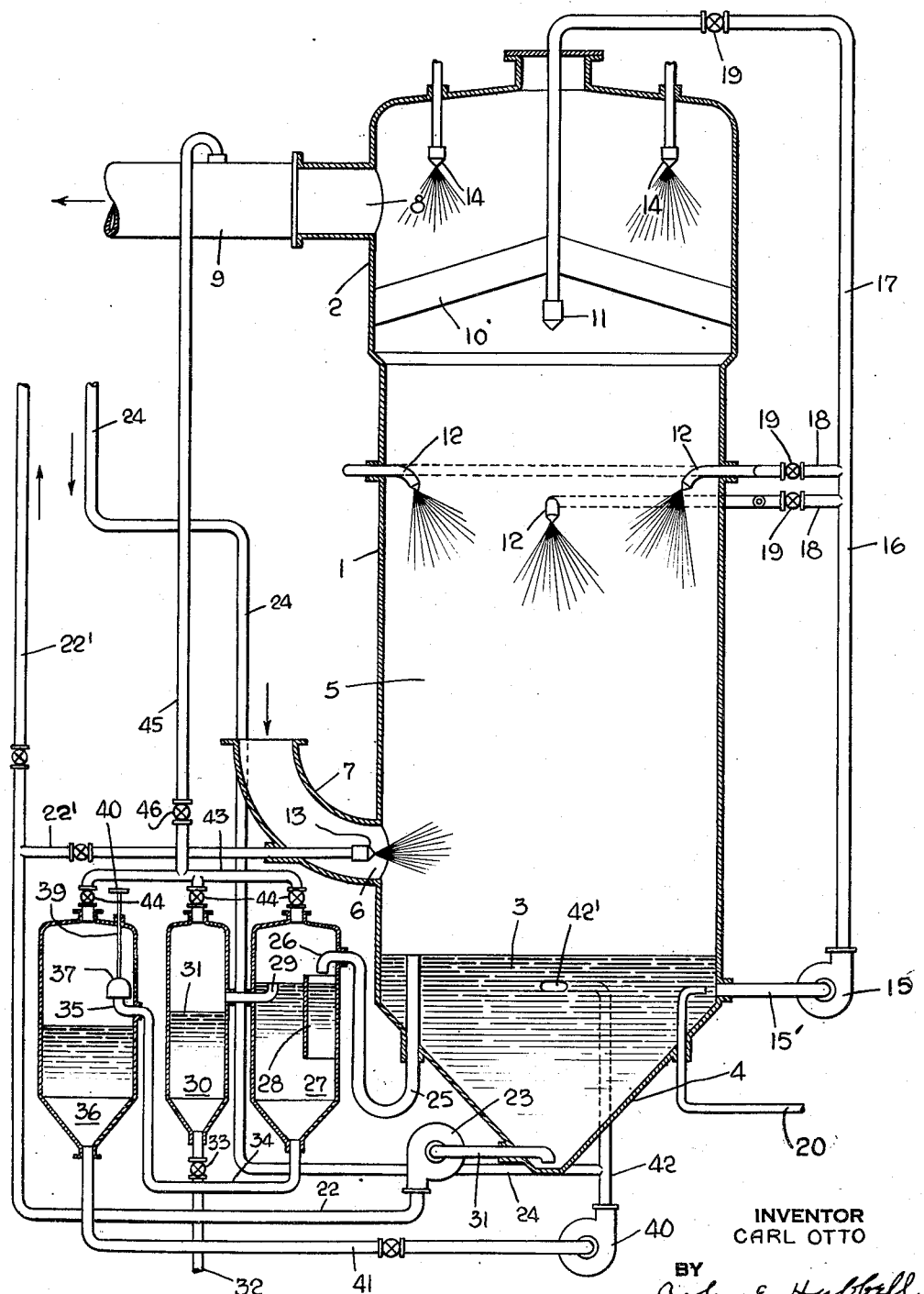
INVENTOR
CARL OTTO
BY
John E. Hubbell
ATTORNEY Patented July 21, 1953

2,646,345

UNITED STATES PATENT OFFICE 2,646,345

AMMONIA SATURATOR AND TAR REMOVAL APPARATUS

Carl Otto, Manhasset, N. Y.

Application February 2, 1950, Serial No. 141,963

3 Claims. (Cl. 23—260)

The general object of the present invention is to provide a spray saturator for use in converting the ammonia content of a gas having a small ammonia content, such as coke oven gas, into ammonium sulphate in a scrubbing chamber into which finely divided acidified ammonium sulphate liquor is sprayed into a stream of gas under a pressure substantially higher, for example ten pounds per square inch higher, than the pressure of the external atmosphere.

I have heretofore invented and developed spray saturators for operation with a gas pressure differing little from the pressure of the atmosphere, such as the saturators disclosed in my copending application, Serial No. 14,902, filed March 15, 1948, and in earlier applications of which said application, Serial No. 14,902, is a continuation-in-part.

A practically important object of the present invention is to adapt a spray saturator of the general type disclosed in said co-pending application for use in recovering ammonia from gas under pressure appreciably above that of the atmosphere, without requiring material changes in the general structure of the saturator. In the preferred form of the present invention, the liquor space is located in the lower portion of a vertically elongated tank, with the spray scrubbing space directly above the bath space, and advantageously having a conical pervious baffle wall extending across the tank between the upper end of the scrubbing space and a gas outlet.

A specific object of the invention is to provide a bath liquor overflow and liquor return arrangement, including relatively simple and effective provisions for separating tar from the overflowing liquor and for returning to the bath the liquor from which the tar has been separated without significant reduction in the pressure of the liquor.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiment of the invention.

The one figure of the accompanying drawing is a diagrammatic representation of a spray saturator and associated recirculating and tar removing provisions.

In the drawing, I have illustrated an embodiment of the invention comprising a vertically disposed tank 1, having an upper end portion 2 shown as of larger cross section than the subjacent body portion of the tank. The lower end portion 3 of the tank serves as a desupersaturating and crystallizer bath space which includes the hopper bottom portion 4 of the tank and a short lower section of the cylindrical tank space below an unobstructed scrubbing space 5, which constitutes the bulk of the tank space. The gas to be scrubbed passes under pressure into the lower portion of the scrubbing space 5 through an inlet opening 6 to which gas is supplied by an external gas supply pipe shown as including a pipe elbow 7 immediately adjacent the inlet 5. The gas passes away from the saturator through an outlet 8 adjacent its upper end and opening into a gas off take pipe 9. An acid catcher 10 in the form of a pervious barrier or baffle wall of conical form, is interposed between the gas outlet 8 and the scrubbing space 5 below the acid catcher. The gas scrubbing provisions comprise an upper spray nozzle 11, a plurality of intermediate spray nozzles 12, and a lower spray nozzle 13. Each of the nozzles 11, 12 and 13 may well be of the commercially available anti-clogging, atomizing type disclosed in the Eneas Patent No. 1,101,264, of June 23, 1914.

Advantageously the conical acid catcher wall 10 has a conical angle of 10° or more, and has a peripheral edge extending into engagement with the tank shell, and is suitably supported by the latter. The pervious wall 10 may be formed of saddle bricks or Rauschig rings, or by some other pervious baffle wall arrangement. The pervious wall 10 needs to be cleaned from time to time, and this may be effected by spraying hot water through nozzles 14 carried by supply pipes, which extends down into the tank through its upper end wall, and are distributed and arranged to discharge water against substantially all portions of the upper surface of the wall 10. A substantial portion of the liquor thus sprayed on to the pervious conical wall 10 will drain to the peripheral edge of the wall 10 and then flow in film form downward along the inner surface of the tank wall, carrying with it the dissolved salt which may have previously accumulated on and in the wall 10 and on the tank wall.

The scrubbing liquor sprayed into the gas moving upward through the scrubbing space 5 comprises a dilute solution of ammonium sulphate preferably saturated and admixed with from five to ten per cent by weight of sulphuric acid which has been withdrawn from the bath space 3 and entraining ammonium sulphate crystals. The liquor and entrained crystals supplied to the spray nozzles 11 and 12, are withdrawn from the bath space 3 by a pump 15 having its inlet pipe 15' opening to the bath space 3 adjacent the upper end of the latter. Make-up acid is supplied by the pipe 20 which has its discharge end in the bath space 3 adjacent and directed toward the inlet end of the pipe 15'. The outlet pipe 16 of the pump 15 has one branch 17 terminating in a discharge end portion which extends centrally downward through the top wall of the tank and through the central portion of the acid catcher wall 10 to supply liquor to the nozzle 11 carried at the lower end of said branch. Other discharge branches 18 of the pipe 16, extend through the tank wall and supply liquor to spray nozzles 12. All or one or more of the branch pipes 17 and 18 may include a throttling valve 19 for use in regulating the relative amounts of liquor discharged through the different nozzles. The spray nozzle 13 receives liquor through the branch 22' from the outlet pipe 22 of a pump 23. The pump 23 has its inlet pipe 23' arranged to withdraw saturated liquor and entrained crystals from the lower end of the hopper bottom portion 4 of the tank. The pipe 22 includes a portion 22' for passing crystals and the liquor entraining them to separating apparatus of any usual or suitable form. Such apparatus as is explained in said application, Serial No. 14,902 ordinarily includes a centrifugal or other drier for separating crystals from entraining liquor and drying them, and a pipe such as the pipe 24 for returning liquor to the crystallizer bath space.

Liquor overflows from the bath space through a U-shaped pipe 25 having one uprising leg extending through the tank wall and having its upper end open at the desired bath top level. The other leg of the pipe 25 terminates in a gooseneck section 26, which extends through the wall of a small vertically disposed, closed tar pot or decanter 27. As shown, the pipe section 26 extending into the decanter tank 27 has its discharges through its down turned end into a vertically disposed sleeve 28. The latter has its open upper end above, and its open lower end substantially below the decanter liquor level. That level is fixed by an overflow connection 29, shown as comprising a horizontal portion extending through the decanter shell with an uprising portion open at its upper end in the decanter. The other end of the pipe 29 opens into a tar tank 30 above the tar level 31, normally maintained in the latter.

In the operation contemplated, tar is discharged from the tank 30 through a discharge pipe 32 during intermittent periods in which a discharge valve 33 in the pipe 32 is open. There is a continuous gravitational flow of liquor out of the lower hopper bottom end of the decanter 27 through an outlet pipe 34. The latter includes an uprising discharge end portion 35 which opens into the upper portion of a closed liquor reservoir and return tank 36. The liquor flow into the tank 36 through the pipe 34, is normally of relatively small volume and may be regulated or controlled by the movement toward and away from its open upper end of a manually adjustable valve or throttling member 37. As shown, the latter is carried at the lower end of a stem 39, which extends vertically through the upper end wall of the tank 36 and is provided at its outer upper end with a handle 40 for moving the member 37 toward and away from the discharge end 35 of the pipe 34. Liquor collecting in the lower end of the return tank 36, may be returned to the bath space 3 continuously or intermittently by means of a pump 40. As shown, the latter has a valved inlet pipe 41 connected to the lower end of the hopper bottom portion of the tank 36. The pump 40 discharges tangentially into the bath space 3 through the pump outlet pipe 42. The latter extends through the bottom wall 4 of the tank 1, and has its open end 42' discharging tangentially into the peripheral portion of the bath space, near the upper end of the latter.

In accordance with the present invention, the upper end of each of the tanks 27, 30 and 36 is connected to a pressure equalizing pipe 43 through an individual uprising connection including a valve 44 and opening through the top wall of the tank. The pipe 43 is connected through a pipe 45 including a valve 46 to the gas outlet pipe 9, so that when the valves 44 and 46 are open, the gas pressure in the upper ends of the tanks 27, 30 and 36 is substantially equal to the pressure of the gas moving through the tank 1. With the pressures in the upper ends of the tanks 27, 30 and 36, thus equalized with the gas pressure in the saturator outlet pipe 9, the liquor level in the decanter tank 27 will be maintained approximately constant at an overflow level fixed by the pipe 29 and which may be, but little below the liquor level in the bath space 3. The liquor level in the tank 30 may fluctuate between a maximum but little below the liquor level in the tank 1, and a lower level which has no relation to the levels in any of the other tanks and depends simply on the adjustment of the discharge valve 33 through which the tar is discharged into a tar well or receptacle not shown in the drawing.

It is possible to automatically control the tar level in the tank 30 by the use of means adjusting the valve response to changes in the height of liquid level in that tank. In practice, however, the discharge valve 33 may well be manually controlled and opened at intermittent intervals, or by throttling the valve as required to keep the tar level in the tank 30 suitably below the level in the tank 27. When the discharge valve 33 is closed, the tar level in the tank 30 gradually builds up as tar overflows from the decanter tank 27.

The previously mentioned liquor return pipe 24 may be directly connected to the tank 1 at a level below, but adjacent the upper end of the crystallizer space 3. As shown, however, the pipe 24 is connected to the space 3 through the outlet pipe 42 of the pump 40. The liquor may be moved from the separator into the pipe 24 by a pump in some cases. In other cases, the separator may well be located at a level sufficiently high above the bath space to drain by gravity into said space directly, or through the pipe 24.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my inventions may be used to advantage without a corresponding use of other features.

Having now described my invention, what I claim as new and desire to secure by Letters Patent, is:

1. In spray saturator and tar eliminating apparatus for the production of ammonium sulphate from distillation gas having a small ammonia content and comprising a vertically disposed tank structure enclosing a chamber including an upper substantially unobstructed gas scrubbing space and a liquor desupersaturating and crystallizing bath space below said scrubbing space and arranged to receive liquor, tar and crystals from the latter, an overflow conduit connected to said structure and having its inlet end open to said chamber at a level intermediate the upper and lower ends of said chamber and operative to discharge bath liquor and tar at said level, said structure having a gas inlet and a gas outlet respectively opening to lower and upper portions of said scrubbing space, spray nozzles mounted in said structure to discharge into said scrubbing space, pumping and conduit means connected to said structure to withdraw liquor and crystals from said bath space, and to pass liquor and crystals through said spray nozzles into said scrubbing space through said spray nozzles and having an outlet for passing liquor and crystals to crystal separating apparatus, and means for adding make-up acid to the liquor passed into said scrubbing space, the improvement comprising conduit means for connecting said gas inlet to a source of distillation gas under pressure to maintain a gas pressure in said scrubbing space substantially above the pressure of the atmosphere, a first closed tar tank connected to said overflow conduit to receive liquor and tar overflowing from said bath space, said overflow conduit having its outlet end opening into said tar tank at a second level below the first mentioned level and below the top of said tar tank, the latter having an overflow outlet open to said tar tank at a third level below said second level, a second closed tar tank into which said second overflow conduit discharges at a fourth level below said second level and below the top of said second tar tank, a gas pressure equalizing connection between said gas scrubbing space and the upper end portion of each of said tar tanks, said second tar tank having a tar outlet opening to the tank at a level below said second level, and means for regulating flow through the last mentioned outlet.

2. The improvement specified in claim 1, comprising means including a return pump for withdrawing liquor from the lower portion of said first tar tank and returning it to said bath space.

3. The improvement as specified in claim 2, in which the means for returning liquor and entrained crystals from the first tar tank to the saturator tank includes a closed reservoir, a conduit opening from the first tar tank adjacent its lower end and discharging into said reservoir at a level below the first mentioned level, said reservoir having an outlet below the first mentioned level and connected to the inlet of said return pump and means for equalizing the gas pressure in the upper end of said reservoir with the gas pressure in said scrubbing space.

CARL OTTO.

References Cited in the file of this patent

UNITED STATES PATENTS

| Number | Name | Date |
|---|---|---|
| 2,318,463 | Bussmann | May 4, 1943 |
| 2,387,818 | Wethly | Oct. 30, 1945 |
| 2,424,205 | Otto | July 15, 1947 |
| 2,482,643 | Tiddy | Sept. 20, 1949 |
| 2,549,848 | Otto | Apr. 24, 1951 |